United States Patent
O'Connor et al.

(10) Patent No.: US 8,635,264 B2
(45) Date of Patent: Jan. 21, 2014

(54) AUTOMATIC AND DYNAMIC INFORMATION HANDLING SYSTEM PERSONALIZATION

(75) Inventors: Clint H. O'Connor, Austin, TX (US); Gary D. Huber, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 13/316,240

(22) Filed: Dec. 9, 2011

(65) Prior Publication Data
US 2013/0151583 A1    Jun. 13, 2013

(51) Int. Cl.
*G06F 15/16* (2006.01)

(52) U.S. Cl.
USPC ............ 709/202; 709/200; 717/121; 713/100

(58) Field of Classification Search
USPC .................. 709/200, 202; 717/121; 713/100
See application file for complete search history.

(56) References Cited

U.S. PATENT DOCUMENTS

| | | | | |
|---|---|---|---|---|
| 7,908,467 | B2 * | 3/2011 | Philyaw | 713/1 |
| 2009/0172384 | A1 * | 7/2009 | Anson | 713/2 |
| 2010/0332356 | A1 * | 12/2010 | Spolar | 705/27.1 |
| 2011/0178886 | A1 | 7/2011 | O'Connor et al. | |
| 2011/0178887 | A1 | 7/2011 | O'Connor et al. | |
| 2011/0178888 | A1 | 7/2011 | O'Connor et al. | |
| 2011/0191476 | A1 | 8/2011 | O'Connor et al. | |
| 2011/0191765 | A1 | 8/2011 | Lo et al. | |
| 2011/0191863 | A1 | 8/2011 | O'Connor et al. | |
| 2011/0231281 | A1 | 9/2011 | O'Connor et al. | |
| 2012/0023422 | A1 * | 1/2012 | Biton et al. | 715/764 |
| 2012/0061458 | A1 * | 3/2012 | Bahr et al. | 235/375 |
| 2012/0067943 | A1 * | 3/2012 | Saunders et al. | 235/375 |
| 2012/0235792 | A1 * | 9/2012 | Huang et al. | 340/10.1 |
| 2013/0111208 | A1 * | 5/2013 | Sabin et al. | 713/171 |

* cited by examiner

*Primary Examiner* — John Follansbee
*Assistant Examiner* — Anthony Mejia
(74) *Attorney, Agent, or Firm* — Terrile, Cannatti, Chambers & Holland, LLP; Robert W. Holland

(57) ABSTRACT

Information handling systems personalized by addition of a physical component, such as lid having an emblem that attaches to a portable information handling system, have software associated with the physical component automatically applied by interacting with an entitlement network location. An identifier associated with the physical component is automatically read by the information handling system and sent to the entitlement network location to retrieve entitlements for the use of software at the information handling system.

19 Claims, 4 Drawing Sheets

AUTOMATIC AND DYNAMIC INFORMATION HANDLING SYSTEM PERSONALIZATION

BACKGROUND OF THE INVENTION

1. Field of the Invention

The present invention relates in general to the field of information handling system configuration, and more particularly to automatic and dynamic information handling system personalization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system provides flexibility to adjust to end user needs because an end user can select the components used to build the information handling system. For example, enterprises balance system cost and capabilities by selecting processor, storage and display resources based upon the duties of the enterprise employee who will use the system. Similar flexibility is available for individual end users who can, for instance, select more expensive display components when the system is intended primarily for multimedia presentation or less expensive display components when the system is intended for e-mail, web browsing or word processing functions. In order to improve end user satisfaction, information handling system manufacturers attempt to provide end users with meaningful component choices at the time of purchase of an information handling system so that the end user can configure the system with a desired balance between cost and capabilities. One way of accomplishing a build-to-order production of information handling systems is to allow an end user to start an order configuration for a build-to-order information handling system from one of several base configurations and then allow the end user to adjust the base configuration by adding, deleting or changing components of the base configuration. In some instances, the base configuration is manufactured ahead of time and shipped to a distribution point where build-to-order alterations are made. This helps to reduce shipping time by locating distribution points near customer destinations.

One difficulty that arises with ready configuration of information handling systems is that end users will often have difficulty modifying an information handling system on their own after delivery of the information handling system. End user modifications can include software applications loaded to execute on existing hardware components, new hardware components loaded to execute with existing software and hardware components and combinations of new hardware and software added to an existing system. One example of such a modification is the purchase by an end user of a software computer game that has a new controller device and a replacement for the lid of the computer, the replacement lid having a depiction of the end user's favorite team. Integration of the purchase into an existing information handling system includes several steps that involve removing and attaching hardware components, adding software components and obtaining licenses for the software and art work. For example, an end user might purchase a replacement lid that includes a license to play the game. Detaching the existing lid and attaching the replacement lid is a relatively simply physical manipulation of the system, however, the end user will have to find the correct network location to download the game, input the correct license information and manually change the wallpaper displayed with the desktop to have the team's logo presented. Difficulties in modifying the information handling system reduce the end user's experience and can lead to warranty calls to the system manufacturer, thus increasing manufacture and support costs.

SUMMARY OF THE INVENTION

Therefore a need has arisen for a system and method which dynamically accommodates configuration changes made at an information handling system.

In accordance with the present invention, a system and method are provided which substantially reduce the disadvantages and problems associated with previous methods and systems for accommodating configuration changes made at an information handling system. A physical component added to an information handling system is automatically detected and identified by the information handling system. An identifier for the physical component is sent to an entitlement engine to retrieve and apply entitlements at the information handling system that are associated with the physical component, such as software.

More specifically, an information handling system built from a plurality of physical components is delivered to an end user. Upon power up, an entitlement agent running on a processor of the information handling system contacts an entitlement server to obtain entitlements associated with the information handling system, such as software ordered by the end user as part of a first configuration for the information handling system. After application of entitlements at the information handling system to bring the information handling system to the first configuration, the entitlement agent monitors for the addition of physical components at the information handling system, such as the coupling of an attachable lid having an emblem associated with a software game. A change in physical components at the information handling system is detected by an identification reader, which reads an identifier from a new physical component added to the information handling system. For example, the identification reader is an RFID reader that reads an RFID tag coupled to the attachable lid, or a camera that reads a QR code coupled to the attachable lid or recognizes an emblem on the attachable lid. A QR code may be coupled to the lid with a physical or logical coupling, such as a sticker physically attached to the lid or embedded in the lid material, or a paper couple that arrives with or is removed from the lid to be presented to the camera. The entitlement agent sends the identifier to the entitlement engine to automatically retrieve and apply entitlements associated with the new physical component, such as loading a software game associated with an emblem disposed on an attachable lid.

The present invention provides a number of important technical advantages. One example of an important technical advantage is that an end user can modify an information handling system with less complexity, resulting in a more rapid and error-free modification that provides an improved end user experience. New entitlements for an information handling system are generated on the fly by dynamically adjusting configuration steps with purchase of an information handling system. Whether the end user obtains a hardware or software component from the information handling system manufacturer, a retailer or a third party as a gift, the end user automatically and dynamically modifies the information handling system to operate with the hardware or software component through the information handling system's manufacturer's distribution network. Digital assets, such as licenses to use software or present protected images, are managed by determining rights based upon physical assets in the end user's possession. Entitlement requests for the digital assets are intercepted and managed from a common distribution location.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Physical component changes at an information handling system are automatically detected and identified to retrieve entitlements associated with the physical component to the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
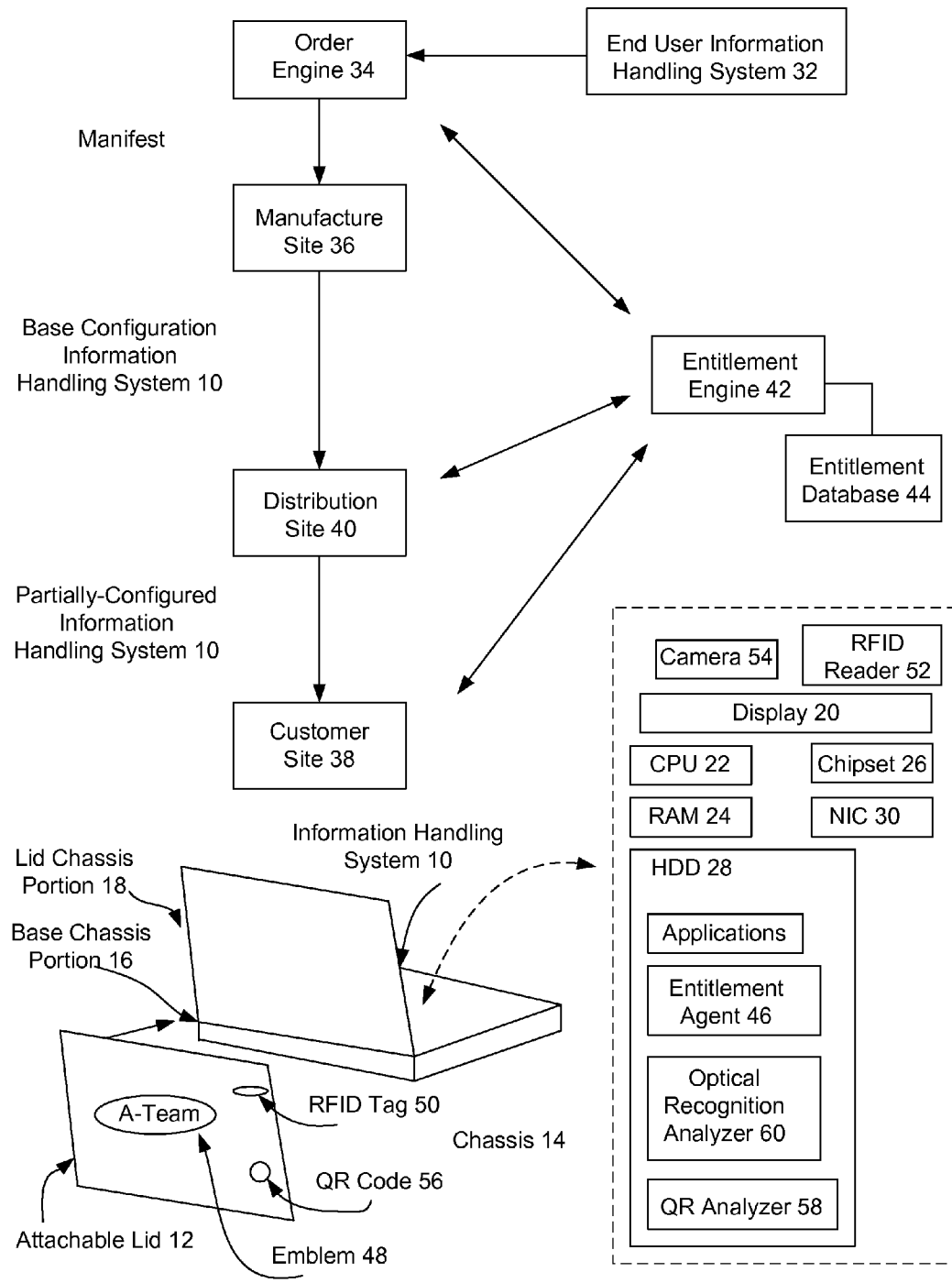
FIG. 1 depicts a block diagram of a system for automatically applying entitlements at an information handling system in response to detection of a changed physical component at the information handling system.

Referring now to FIG. 1, a block diagram depicts a system for automatically applying entitlements at an information handling system 10 in response to detection of a changed physical component 12 at the information handling system 10. In the example embodiment depicted by FIG. 1, information handling system 10 has a portable chassis 14 with a clamshell configuration having a base portion 16 and a rotationally coupled lid portion 18. In alternative embodiments, alternative configurations to the clamshell may be used, such as a desktop, tablet, smartphone or a "skin" that covers a device, such as a smart phone protective skin. Plural components disposed in base portion 16 cooperate to process information for presentation at a display 20 disposed in lid portion 18. For example, a central processing unit 22 processes instructions stored in RAM 24 under the management of BIOS firmware in a chipset 26. A hard disk drive 28 provides non-volatile memory to store applications for retrieval to RAM 24. A network interface card (NIC) 30 supports network communications, such as through an Ethernet local area network cable, a wireless local area network or a wireless wide area network.

An end user at an end user information handling system 32 can order a newly manufactured information handling system 10 through an order engine 34 with component selections that define a first configuration tailored to the needs of the end user. For example, the end user selects the type of CPU 22, amount of RAM 24 and the size of hard disk drive 28 to meet an intended use and a cost constraint. In addition, the first configuration might include software applications, such as a selected operating system, word processor and various specialized applications. Once end user information handling system 32 completes the first configuration, order engine 34 provides a manifest to build the information handling system to a manufacture site 36 where physical components are assembled into a chassis 14. In order to ensure a rapid delivery of a newly-ordered information handling system 10 to a customer site 38, information handling systems 10 are built from physical components at manufacture site 36 in a base configuration and shipped to distribution site 40 in anticipation of an end user order. If an existing base configuration at distribution site 40 will adapt to a first configuration defined by a manifest of order engine 34, then an information handling system 10 with the base configuration is pulled from inventory at distribution site 40 and modified to meet the first configuration. The physical information handling system 10 is matched by a unique identifier to the manifest by an entitlement engine 42, which stores in an entitlement database 44 entitlements for software that the end user has purchased for use at information handling system 10.

After entitlements are established for the newly purchased information handling system 10, the information handling system 10 ships from distribution site 40 to customer site 38. Upon initial power up at customer site 38, an entitlement agent 46 executes on CPU 22 of information handling system 10 to contact entitlement engine 42 with the unique identifier for information handling system 10. Entitlement engine 42 retrieves entitlements associated with the unique identifier and provides the entitlements to information handling system 10. For example, an entitlement might include a software application not loaded as part of an initial image on hard disk drive 18, or a key that enables a function already loaded in the initial image. Once the entitlements are loaded by entitlement agent 46, information handling system 10 is at the first configuration to fulfill the order placed by the end user. In the example embodiment, order engine 34 and entitlement engine 42 are instructions stored in a machine readable medium of a server information handling system that execute on a processor to provide the described functions through a network, such as the Internet.

Entitlement engine 42 and entitlement agent 46 remain available after the first configuration is established to adapt information handling system 10 to a changed physical component. In the example embodiment depicted by FIG. 1, a lid attachment 12 with an emblem 48 is coupled to lid chassis portion 18 of chassis 14 for decorative purposes. Lid attachment 12 includes a radio frequency identification (RFID) tag 50 that stores an identifier, such as a part SKU number or a unique identifier for the lid attachment. Information handling system 10 includes an RFID reader 52 integrated in chassis 14 that automatically reads RFID tag 50 and provides the identifier of RFID tag 50 to entitlement agent 46. Entitlement agent 46 recognizes the identifier as a change in a physical component at information handling system 10 and, in response, contacts entitlement engine 42 to obtain entitlements associated with the newly added physical component. Although RFID reader 52 provides one way of detecting a change in physical components at information handling system, other techniques may be used. For example, a camera 54 integrated in chassis 14 can capture an image of a QR code 56 disposed on attachable lid 12 so that a QR code analyzer 58 running on information handling system 10 can extract an identifier for use by entitlement agent 38. Alternatively, camera 54 can capture an image of emblem 48 so that an optical recognition analyzer 60 can analyze the emblem to determine an identifier associated with the emblem.

In the example embodiment depicted by FIG. 1, emblem 48 represents a football team in a software football game that the end user can play on information handling system 10. The end user obtains attachable lid 12 from a retail store or as a gift and replaces the existing lid at information handling system 10 with attachable lid 12 at chassis lid portion 18. Entitlement agent 46 obtains the identifier associated with the lid and contacts entitlement engine 42 through a network, such as the Internet, to retrieve entitlements associated with the attachable lid identifier. Attachable lid 12 may be sold with bundled software or content services, such as wallpaper, software, content, services, system settings like over-clocking values for a CPU and/or graphics system when a program is used, and other digital assets. For example, an end user might purchase attachable lid 12 with a software football game for use on information handling system 10. The identifier of attachable lid 12, such as a unique SKU in RFID tag 50, is stored in entitlement database 44 along with entitlements associated with attachable lid 12. Entitlement engine 42 responds to the attachable lid identifier received from information handling system 10 by associating the entitlements with an identifier of information handling system 10 and making the entitlements available for application by entitlement agent 46. For instance, using the football game example, if the end user has already paid for the game then the game is downloaded to information handling system 10; if the end user has not paid for the game, then the end user is provided with an interface to purchase the game. Some examples of free entitlements that might also be included are wallpaper for use as background to the desktop presented at display 20 of information handling system 10; or social networking for the game and the team represented by emblem 48. In one example embodiment, the identifier read from attachable lid 12 is used for authentication to substitute for a license key, obviating the need for an end user to input the license key.

Although the example provided personalizes information handling system 10 by adding software game associated with an emblem of an attachable lid, other types of physical components may be detected and checked for entitlements to apply digital assets at information handling system 10. Where digital assets already paid for by the end user are tied to a physical component, the need to obtain a license key is intercepted and the entitlement is automatically applied at information handling system 10 so that minimal intervention is called for by an end user. Entitlements for information handling system 10 are generated on the fly in a dynamic manner as changes in physical components at an information handling system are detected without regard to how the end user obtained the newly-added physical component.

Figure 2:
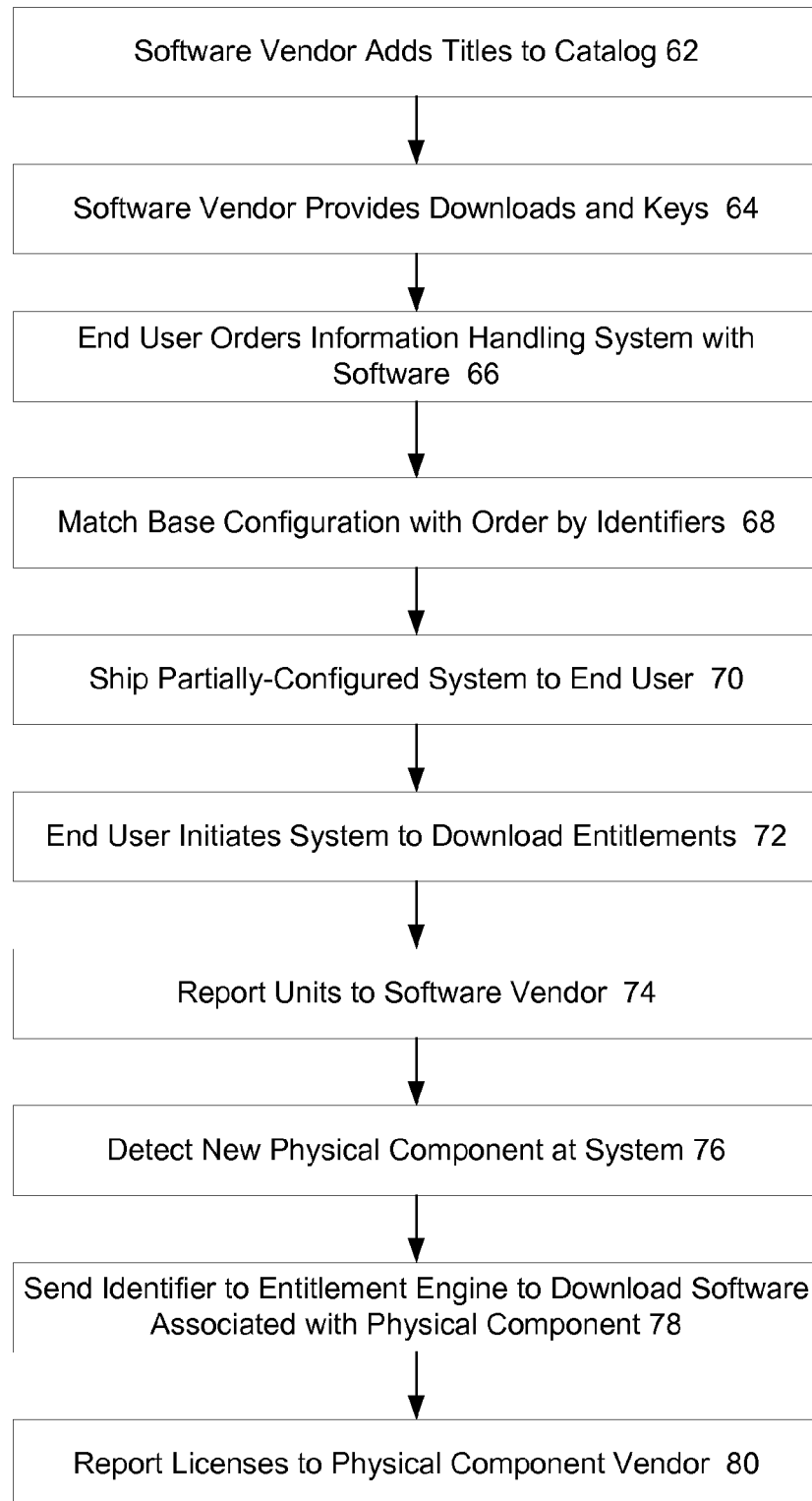
FIG. 2 depicts a flow diagram of a process for distributing entitlements in response to a changed physical component at an information handling system.

Referring now to FIG. 2, a flow diagram depicts a process for distributing entitlements in response to a changed physical component at an information handling system. The process begins at step 62 with a software supplier entering software to an information handling system manufacturer entitlement database. At step 64, the software manufacture provides downloads and license keys for the software to the entitlement database. At step 66, an end user orders an information handling system with a first configuration that includes at least some software from the entitlement database. At step 68, in response to the end user purchase, the information handling system manufacturer matches the order to a physical system at a distribution site and gets a unique identifier for the physical system to associate a license key from the entitlement database with the unique identifier. At step 70, the physical system is shipped to the customer site of the end user who ordered the information handling system. At step 72, the end user powers up the information handling system to initiate the entitlement agent, which downloads all entitlements associated with the information handling system identifier, such as by downloading software from the entitlement database that is associated with the information handling system unique identifier to bring the system to the first configuration. At step 74, the information handling system manufacturer reports the software sale to the software manufacturer. Alternatively, sale recognition can occur at step 64 or 70, or when most convenient for the software vendor and information handling system manufacturer.

Once the information handling system is in the first configuration, the entitlement agent on the information handling system monitors for changes in the physical components at the information handling system. Alternatively, a separate change monitoring module notifies the entitlement agent if a change occurs, such as a modified RFID reader or other device that contacts the entitlement agent through an API if a predetermined tag is detected or no longer detected. At step 78, the entitlement agent detects an identifier of an added physical component and sends the physical component identifier and information handling system identifier to the entitlement engine to determine if entitlements exist for the physical component at the information handling system. At step 80, the entitlement engine updates the entitlement database to reflect the added physical component and sends entitlements associated with the physical component to the information handling system for application by the entitlement agent. In this manner, the entitlement system used to aid in configuration of an information handling system at initial ordering is leveraged to personalize configuration of the information handling system as physical components are added to the system.

Figure 3:
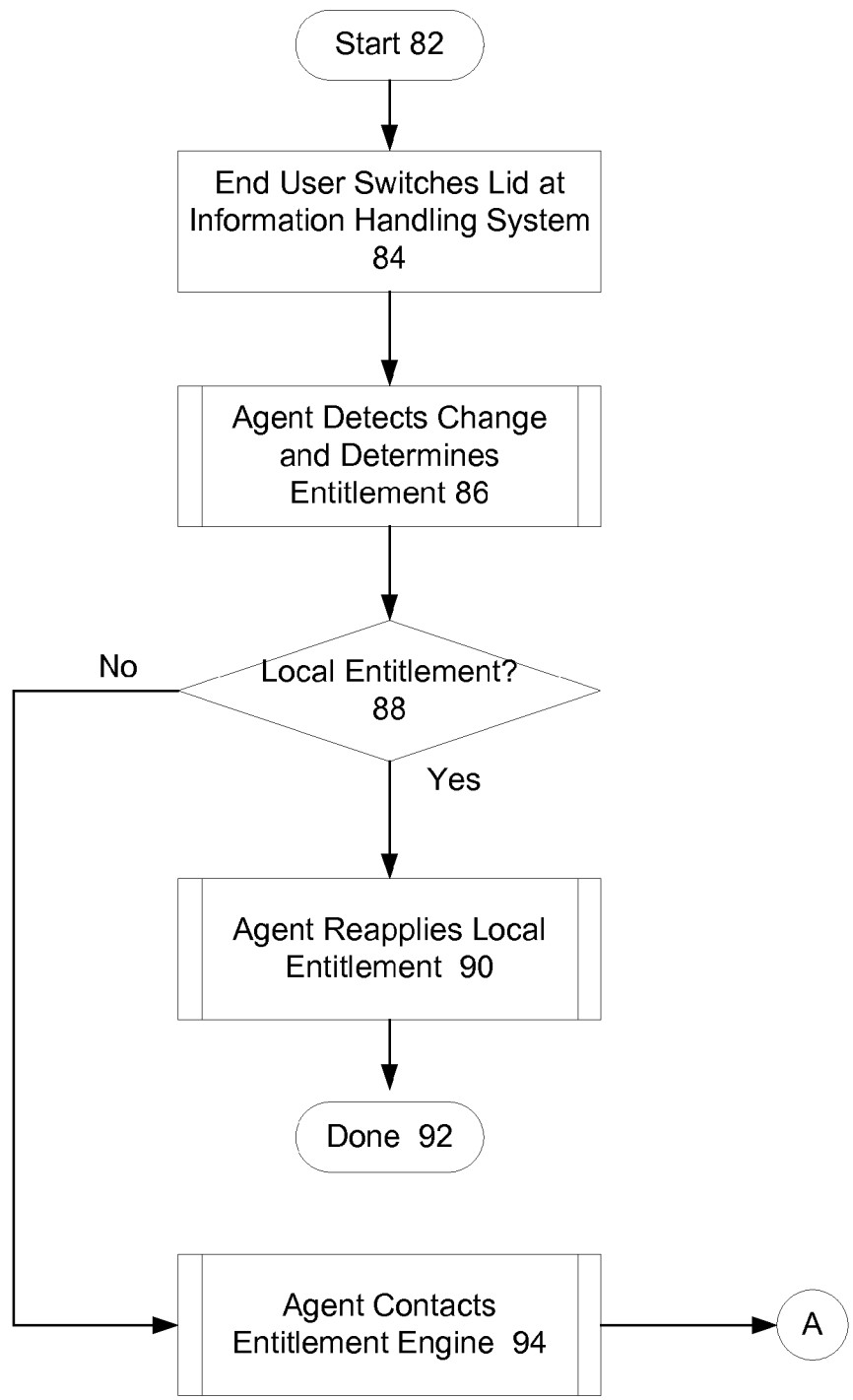
FIG. 3 depicts a flow diagram of a process for an entitlement agent at an information handling system to obtain entitlements from an entitlement engine.

Referring now to FIG. 3, a flow diagram depicts a process for an entitlement agent at an information handling system to obtain entitlements from an entitlement engine. The process starts at step 82 with an end user acquiring a physical component to add to an information handling system, such as an attachable lid with an emblem. At step 84, the end user couples the attachable lid to the information handling system. At step 86, the entitlement agent detects the change and determines the associated entitlement. At step 88, a determination is made of whether an entitlement associated with the attachable lid already exists locally at the information handling system, such as might happen if the lid had already been attached to the information handling system on a previous occasion. If an entitlement already exists locally, the process continues to step 90 to apply the entitlement at the information handling system and completes at step 92. If a local entitlement does not exist, the entitlement agent contacts the entitlement engine to determine if entitlements exist and to retrieve and apply the entitlements.

Figure 4:
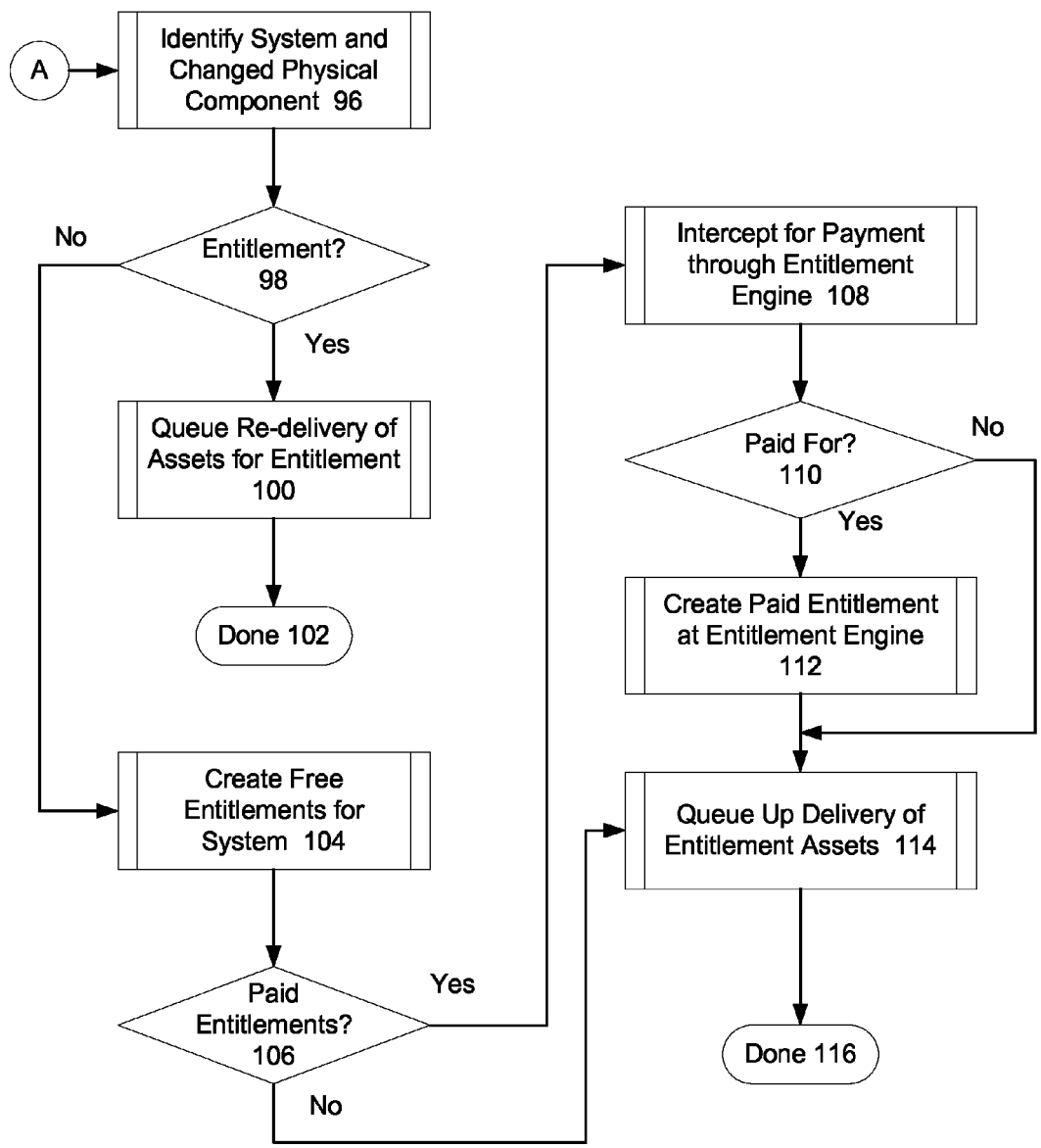
FIG. 4 depicts a flow diagram of a process for an entitlement engine to respond to a request for an entitlement at an information handling system.

Referring now to FIG. 4, a flow diagram depicts a process for an entitlement engine to respond to a request for an entitlement at an information handling system. At step 96, the entitlement engine parses identifiers received from the entitlement agent for the added physical component and the information handling system. At step 98, a determination is made of whether entitlements already exist for the identifiers. If so, the process continues to step 100 to queue up delivery or re-delivery of assets associated with the entitlement to the information handling system and the delivery is completed at step 102. If at step 98 entitlements do not already exist, the process continues to step 104 to create entitlements that are included with the physical component for download to the information handling system, such as free wallpaper having the emblem included on an attachable lid. At step 106, a determination is made of whether entitlements exist for the physical component that are available for purchase by an end user. If so, the process continues to step 108 to intercept payments for the entitlement by the entitlement engine. At step 110, a determination is made of whether the end user has paid for additional entitlements. If so, the process continues to step 112 to create the paid for entitlements and record the payment in the entitlement database for future reference and to credit the entitlement licensor. If no paid entitlements are purchased at step 110, the process continues to step 114. At step 114, purchases and included entitlements are queued for delivery to the information handling system. At step 116, the process completes with download of the entitlements to the information handling system and application of the entitlements at the information handling system.

Although the present invention has been described in detail, it should be understood that various changes, substitutions and alterations can be made hereto without departing from the spirit and scope of the invention as defined by the appended claims.

What is claimed is:

1. A method for personalization of an information handling system, the method comprising:
   identifying a physical component change at the information handling system by reading an identifier from the physical component with an automated identification reader incorporated in the information handling system, the physical component having at least a coupling adapted to couple with a lid chassis portion of the information handling system, and the identifier including at least a marking adapted for analysis from an image taken by a camera integrated in the information handling system of the marking;
   applying the identifier using an entitlement agent running on the information handling system to retrieve one or more entitlements associated with the physical component from a network location; and
   applying the one or more entitlements with the entitlement agent to deliver and personalize digital assets loaded on the information handling system.

2. The method of claim 1 wherein identifying a physical component change further comprises:
   detecting a near field communication device in the physical component with a near field communication reader of the information handling system; and
   in response to detecting, reading the identifier from the near field communication device with the near field communication reader.

3. The method of claim 2 wherein the near field communication device comprises a radio frequency identification tag and the near field communication reader comprises a radio frequency identification reader.

4. The method of claim 1 wherein identifying a physical component change further comprises:
   capturing an image of a quick response code disposed on the physical component with the camera of the information handling system; and
   analyzing the quick response code to determine the identifier.

5. The method of claim 1 wherein identifying a physical component change further comprises:
   capturing an image of the physical component with the camera integrated in the information handling system; and
   analyzing the image to determine the identifier.

6. The method of claim 5 wherein the lid chassis having an emblem, the lid chassis operable to couple to a portable information handling system housing lid chassis, and wherein analyzing the image comprises analyzing the emblem with optical recognition to determine entitlements associated with the emblem.

7. The method of claim 1 wherein the lid chassis having an emblem, the lid chassis operable to couple to a portable information handling system housing lid chassis, and wherein applying the one or more entitlements comprises automatically presenting wallpaper having the emblem at a desktop of the portable information handling system.

8. The method of claim 1 wherein applying one or more entitlements further comprises presenting an option to purchase digital assets at the information handling system, the digital assets associated with an emblem of a lid chassis.

9. The method of claim 1 wherein applying the identifier with an entitlement agent further comprises:
   looking up at the network location entitlements associated with the information handling system; and
   modifying at the network location the entitlements associated with the information handling system to include an entitlement associated with the physical component identifier;
   sending a license key for a digital asset associated with the identifier from the network location to the information handling system; and
   automatically applying the license key at the information handling system to authorize the digital asset at the information handling system.

10. A system for personalization of an information handling system, the system comprising:
    a processor executing:
    an order engine operable to accept end user selections to define a configuration of the information handling system and to identify one or more entitlements associated with the configuration;

an entitlement engine interfaced with the order engine and operable to store the one or more entitlements;

an entitlement agent stored on the information handling system and operable to interface with the entitlement engine through a network to obtain the one or more entitlements and to apply the one or more entitlements to configure software at the information handling system; and an identification reader integrated in the information handling system, the identification reader operable to detect an identifier of a physical component added to the information handling system and to provide the identifier to the entitlement agent, the physical component adapted to couple to a lid chassis portion of the information handling system, the identifier including at least a near field communication device;

wherein the entitlement agent contacts the entitlement engine with the identifier to obtain one more entitlements associated with the physical component and to apply the one or more entitlements to configure digital assets associated with the physical component at the information handling system.

11. The system of claim 10 wherein the lid chassis comprises an emblem to apply the digital assets associated with the lid chassis further comprising: obtaining a wallpaper to be presented at a desktop of the information handling system.

12. The system of claim 11 wherein the emblem is associated with a game that executes on the information handling system, the entitlement engine applying the one or more entitlements to retrieve the game to the information handling system and authorize execution of the game at the information handling system.

13. The system of claim 12 wherein the identification reader comprises:
a camera integrated in the information handling system; and
an optical recognition module running on the information handling system and operable to identify the emblem.

14. The system of claim 10 wherein the identification reader comprises a radio frequency identification reader and the identifier comprises a radio frequency identification tag integrated in the lid.

15. The system of claim 10 wherein the identification reader comprises:
a camera integrated in the information handling system; and
a quick response code reader running on the information handling system and operable to read the identifier from a quick response code disposed on the lid.

16. A method for personalization of an information handling system, the method comprising:
shipping an information handling system from a manufacture location to a distribution location;
accepting by a processor, an order for delivery of an information handling system having a first configuration to an end user location;
storing by the processor, entitlements associated with the information handling system first configuration at an entitlement network location;
delivering the information handling system to the end user location;
executing by the processor, an entitlement agent running on the information handling system at the end user location to retrieve the stored entitlements;
applying by the processor, the entitlements with the entitlement agent to bring the information handling system to the first configuration;
detecting a physical component change at the information handling system;
reading an identifier from a physical component added to the information handling system, the physical component adapted to couple to a lid chassis portion of the information handling system;
retrieving by the processor one or more entitlements associated with the identifier from the entitlement network location; and
applying by the processor entitlements associated with the identifier at the information handling system to bring the information handling system to a second configuration.

17. The method of claim 16 wherein obtaining an identifier further comprises reading a radio frequency identification tag integrated in the physical component with a radio frequency identification reader integrated with the information handling system.

18. The method of claim 16 wherein obtaining an identifier further comprises capturing an image of a quick response code from the physical component with a camera integrated in the information handling system and analyzing the quick response code at the information handling system to determine the identifier.

19. The method of claim 16 wherein obtaining an identifier further comprises capturing an image of the physical component with a camera integrated in the information handling system and analyzing the physical component image with optical recognition at the information handling system to determine the identifier.

* * * * *